US012105937B2

(12) United States Patent
Lin et al.

(10) Patent No.: US 12,105,937 B2
(45) Date of Patent: Oct. 1, 2024

(54) FACE ORIENTATION-BASED CURSOR POSITIONING ON DISPLAY SCREENS

(71) Applicant: Hewlett-Packard Development Company, L.P., Spring, TX (US)

(72) Inventors: Yi-Chien Lin, Taipei (TW); Chih-Hung Lin, Taipei (TW); Ling-Yu Wu, Taipei (TW); Chih-Shiuan Lee, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/783,318

(22) PCT Filed: Jan. 14, 2020

(86) PCT No.: PCT/US2020/013419
§ 371 (c)(1),
(2) Date: Jun. 8, 2022

(87) PCT Pub. No.: WO2021/145855
PCT Pub. Date: Jul. 22, 2021

(65) Prior Publication Data
US 2023/0015224 A1    Jan. 19, 2023

(51) Int. Cl.
*G06F 3/048*  (2013.01)
*G06F 3/0484*  (2022.01)
*G06T 7/70*  (2017.01)
*G06V 40/16*  (2022.01)

(52) U.S. Cl.
CPC .............. *G06F 3/0484* (2013.01); *G06T 7/70* (2017.01); *G06V 40/172* (2022.01); *G06T 2207/30201* (2013.01)

(58) Field of Classification Search
CPC .................... G06F 3/0484; G06T 7/70; G06T 2207/30201; G06V 40/172
See application file for complete search history.

(56) References Cited

U.S. PATENT DOCUMENTS

| 9,720,566 B1 * | 8/2017 | Smyth ..................... G06F 9/451 |
| 9,940,900 B2 | 4/2018 | Ben-Bassat |
| 10,579,861 B2 * | 3/2020 | Kohlmeier-Beckmann ................. G09G 5/14 |
| 2002/0126090 A1 | 9/2002 | Kirkpatrick et al. |

(Continued)

FOREIGN PATENT DOCUMENTS

| EP | 2699993 A1 | 2/2014 |
| GB | 2440348 A | 1/2008 |
| WO | 2012/145180 A1 | 10/2012 |

*Primary Examiner* — David E Choi
(74) *Attorney, Agent, or Firm* — Quarles & Brady LLP

(57) ABSTRACT

In one example, an electronic device may include a display screen defining a plurality of display regions. Further, the electronic device may include a camera to capture an image of an operator of the electronic device. Furthermore, the electronic device may include a controller operatively coupled to the camera and the display screen. The controller may detect an orientation of the operator's face with respect to the display screen using the captured image. Further, the controller may determine a first display region of the plurality of display regions corresponding to the detected orientation of the operators face. Furthermore, the controller may activate the first display region to position a cursor of a pointing device within the first display region.

17 Claims, 4 Drawing Sheets

(56) References Cited

U.S. PATENT DOCUMENTS

| | | |
|---|---|---|
| 2009/0213071 A1 | 8/2009 | Li et al. |
| 2010/0182232 A1 | 7/2010 | Zamoyski |
| 2012/0094773 A1* | 4/2012 | Suzuki .................... A63F 13/79 |
| | | 463/43 |
| 2014/0002352 A1 | 1/2014 | Jacob et al. |
| 2014/0208273 A1* | 7/2014 | Moffett ................. G06F 3/0484 |
| | | 715/856 |
| 2015/0309569 A1* | 10/2015 | Kohlhoff ............. G06V 40/193 |
| | | 382/103 |
| 2016/0299564 A1* | 10/2016 | Sawada ............... G06F 3/04845 |
| 2018/0164879 A1* | 6/2018 | Moffat .................... G06F 3/017 |
| 2018/0318706 A1* | 11/2018 | Nishimaki ............. G09F 19/00 |
| 2019/0278365 A1* | 9/2019 | Skulina .................. G06F 3/013 |
| 2019/0346988 A1* | 11/2019 | Sullivan ................ G06F 3/0481 |
| 2021/0232843 A1* | 7/2021 | Xu ....................... G06V 30/414 |

* cited by examiner

FACE ORIENTATION-BASED CURSOR POSITIONING ON DISPLAY SCREENS

BACKGROUND

Pointing devices, such as mice, trackpads, trackballs, and the like, may enable to control a position of a cursor within a display screen. For example, the pointing devices may provide an ability to control a movement of the cursor across the display screen and an ability to control other aspects, such as scroll bars, zooming, and the like, within a graphical user interface of the display screen.

BRIEF DESCRIPTION OF THE DRAWINGS

Examples are described in the following detailed description and in reference to the drawings, in which.

DETAILED DESCRIPTION

Figure 1:
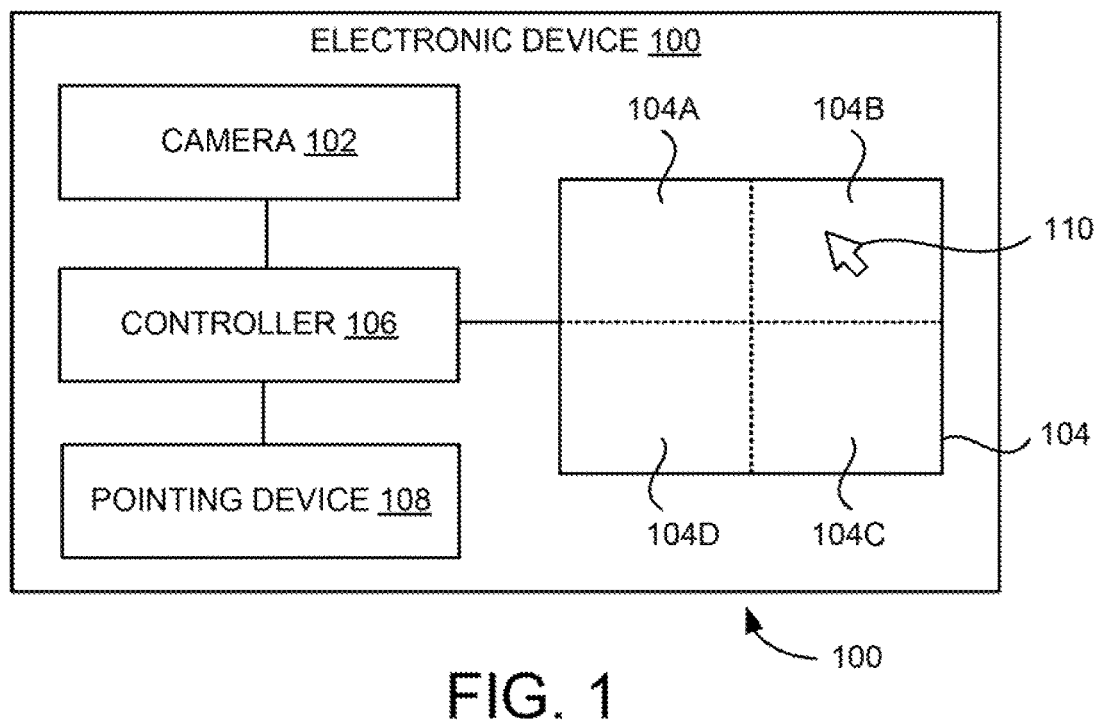
FIG. 1 is a block diagram of an example electronic device, including a controller to activate a first display region of a display screen to position a cursor.

Pointing devices, such as mice, touchpads, trackballs, and the like, may facilitate an operator of an electronic device to control a position of a cursor within a graphical user interface of a display screen. Further, the cursor may travel over the display screen at speeds determined by operator's hand speed and the pointing device's sensitivity. As electronic devices (e.g., notebook computers) are becoming compact, the size of touchpads on the electronic devices may also be minimized.

Further, one of the functions to interact with an electronic device may involve selecting a target using the pointing device. Example target selection may include opening a file, closing a program, activating a world wide weblink, selecting a menu item, redefining a typing or drawing insertion position, and/or other such operations. Further, performing such operations may include moving the cursor from one end of the display screen to another. For example, when an application is be closed, an 'X' button on a right-top corner of the display screen may have to be selected. Further, when a windows button is to be selected, the cursor may have to be moved towards a bottom-left corner of the display screen. Thus, the operator may have to swipe a significant distance to access a display area of the display screen.

In some examples, the cursor movement may be controlled using eye gaze tracking. For example, a point of gaze (POG) of the operator may be identified by performing gaze detection to facilitate movement of the cursor on the display screen.

In other examples, the cursor movement may be controlled based on an intersection of a viewing vector (e.g., in which the operator is looking) and a surface of the display screen. In this example, an area of the display screen that the operator is viewing (e.g., a target position of the cursor) may be computed corresponding to an intersection of the viewing vector and the surface of the display screen. However, such example methods may involve additional computations, for instance, in order to calculate a point of intersection of the viewing vector and the surface of the display screen each time the operator views a different region of the display screen.

Examples described herein may provide an electronic device with a controller to position a cursor on a display screen based on a face orientation of an operator. Example electronic device may include a display screen defining a plurality of display regions. Further, the electronic device may include a camera to capture an image of the operator of the electronic device. Furthermore, the electronic device may include the controller operatively coupled to the camera and the display screen. Example controller may detect an orientation of the operator's face with respect to the display screen using the captured image. Further, the controller may determine a first display region of the plurality of display regions corresponding to the detected orientation of the operators face. Furthermore, the controller may activate the first display region to position a cursor of a pointing device within the first display region. Thus, examples described herein may reduce the amount of movement or force the operator needs to apply to the pointing device to accomplish a cursor movement.

In the following description, for purposes of explanation, numerous specific details are set forth in order to provide a thorough understanding of the present techniques. Further, the example apparatuses, devices and systems, may be practiced without these specific details. Reference in the specification to "an example" or similar language means that a particular feature, structure, or characteristic described is included in at least that one example, but not necessarily in other examples.

Turning now to the figures, FIG. 1 is a block diagram of an example electronic device 100, including a controller 106 to activate a first display region 104B of a display screen 104 to position a cursor 110. Example electronic device 100 may include a notebook computer, tablet computer, personal computer (PC), gaming laptop, dual screen notebook computer, foldable display device, or the like.

Example electronic device 100 may include display screen 104 (e.g., a touchscreen display) defining a plurality of display regions (e.g., 104A-104D). Example display screen 104 may be an interactive display to present programs or applications to an operator of electronic device 100. Example display screen 104 may include liquid crystal display (LCD), light emitting diode (LED) display, electroluminescent (EL) display, or the like.

Further, electronic device 100 may include a camera 102 to capture an image (e.g., a digital video image) of the operator of electronic device 100. Example camera 102 may be a front-facing camera to capture the image of an area in front of electronic device 100. For example, camera 102 may be a webcam, which may be built either into a bezel (i.e., a housing) of display screen 104 or may be formed on a substrate as display screen 104. In other examples, camera 102 may be externally connected to electronic device 100, for instance, via a wired or wireless connection.

Furthermore, electronic device 100 may include controller 106 operatively coupled to camera 102 and display screen 104. Example controller 106 may be an embedded controller, which may be implemented in hardware, machine-readable instructions, or a combination thereof. For example, controller 106 may be implemented as engines or modules including any combination of hardware and programming to implement the functionalities described herein. For example, controller 106 can be implemented with a microcontroller, an application-specific integrated circuit (ASIC), a field programmable gate array (FPGA), or the like. The functions of controller 106 may also be implemented by a processor. In examples described herein, the processor may include, for example, one processor or multiple processors included in a single device or distributed across multiple devices.

Also, electronic device 100 may include a pointing device 108. Example pointing device 108 may be a mouse, touchpad, trackpad, or the like. Pointing device 108 may be a part of electronic device 100 or externally connected to electronic device 100 via a wired or wireless connection. During operation, controller 106 may detect an orientation of the operator's face with respect to display screen 104 using the captured image. In one example, controller 106 may analyze the captured image using image processing techniques to detect the orientation of the operator's face. For example, controller 106 may retrieve information identifying and describing a facial landmark of the operator from the captured image. Example information identifying and describing the facial landmark may include information identifying and describing hair, eyebrows, eyes, glasses, ears, a forehead, a nose, a mouth, or any combination thereof. In other examples, information identifying and describing the facial landmark may include facial wrinkles, teeth, and the like. Further, controller 106 may determine the orientation of the operator's face based on the information identifying and describing the facial landmark.

Furthermore, controller 106 may determine first display region 104B of plurality of display regions 104A-104D corresponding to the detected orientation of the operator's face. In one example, controller 106 may determine the orientation of the operator's face based on at least one of shape and position information included in the information identifying and describing the facial landmark. Furthermore, controller 106 may activate first display region 104B to position cursor 110 of pointing device 108 within first display region 104B.

Figure 2A:
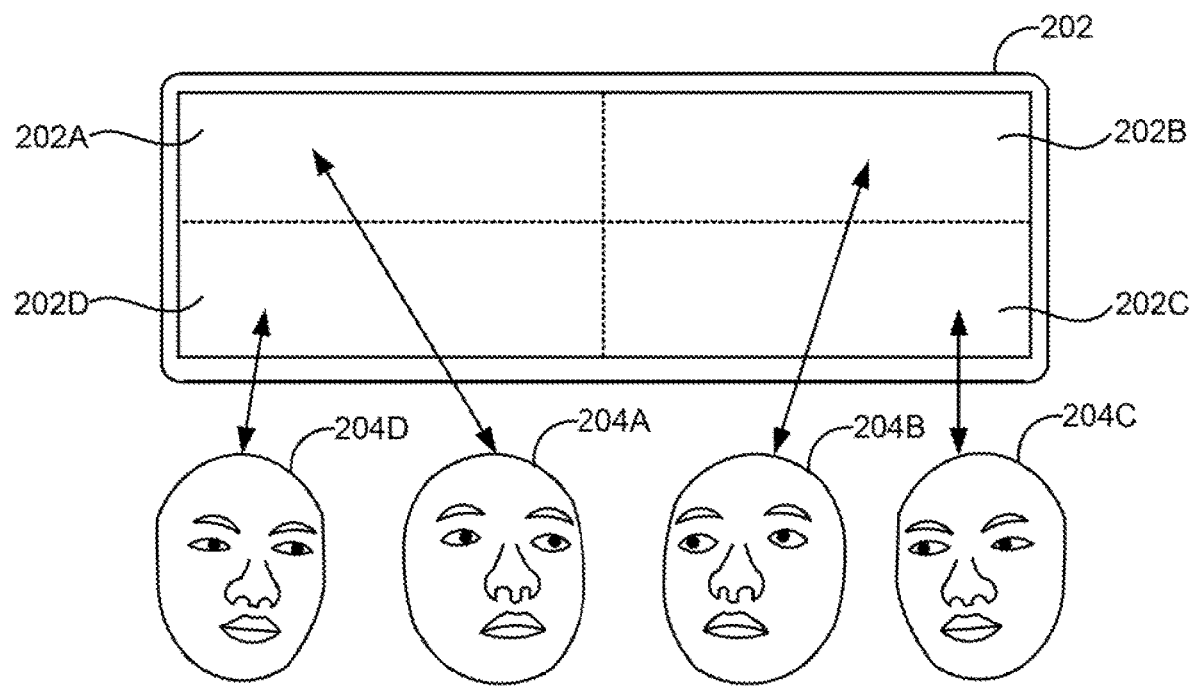
FIG. 2A illustrates a schematic diagram of an example display screen, depicting a plurality of display regions mapped to a plurality of face orientations, respectively.

FIG. 2A illustrates a schematic diagram of an example display screen 202, depicting a plurality of display regions (e.g., 202A-202D) mapped to a plurality of face orientations 204A-204D, respectively. In one example, display screen 202 may be divided into predefined non-overlapping display regions 202A-202D. For example, a number of display regions (e.g., 202A-202D) may be defined based on a size or area of display screen 202. In one example, each of display regions 202A-202D may be mapped to a respective one of face orientations 204A-204D as shown in FIG. 2A. For example, face orientations 204A-204D may depict top-left, top-right, bottom-right, and bottom-left orientations, respectively.

Figure 2B:
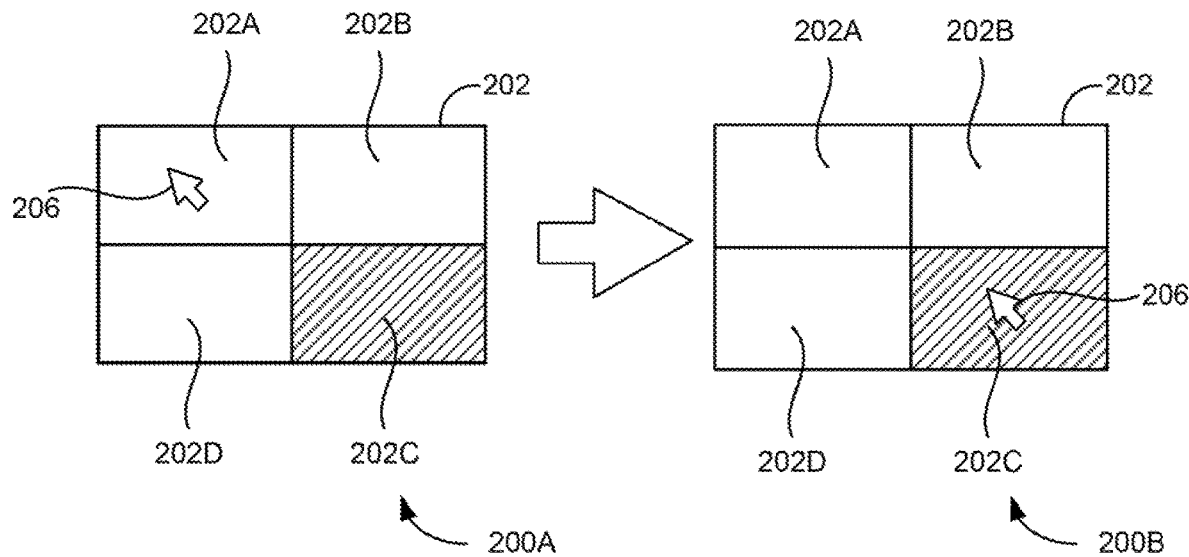
FIG. 2B illustrates a schematic diagram of the example display screen of FIG. 2A, depicting moving a cursor from a first display region to a location in a second display region based on an orientation of an operator's face.

FIG. 2B illustrates a schematic diagram of example display screen 202 of FIG. 2A, depicting moving a cursor 206 from a first display region 202A to a location in a second display region 202C based on an orientation of an operator's face. Similarly named elements of FIG. 2B may be similar in function and/or structure to elements described in FIG. 2A. Consider that cursor 206 may be in first display region 202A. Further, when the operator is looking towards bottom-right, then second display region 202C may be activated as shown in 200A. In this example, a controller (e.g., controller 106 of FIG. 1) can predict that the operator may have an intention to move cursor 206 from first display region 202A to second display region 202C based on the detected face orientation (e.g., bottom-right orientation 204C of FIG. 2A).

In one example, a cursor positioning function may be activated on second display region 202C and the cursor positioning function may be inactivated on remaining display regions 202A, 202B, and 202D based on the orientation of the operator's face. Further, the controller may move cursor 206 from first display region 202A to a location in activated second display region 202C in response to detecting an input from a pointing device as shown in 200B.

In one example, the controller may continuously monitor the orientation of the operator's face with respect to display screen 202 using a camera. Further, the controller may activate one of display regions 202A-202D corresponding to the monitored orientation of the operator's face. Furthermore, the controller may continuously monitor the input from the pointing device and move cursor 206 to a location in the activated one of display regions 202A-202D in response to detecting the input from the pointing device.

Figure 3:
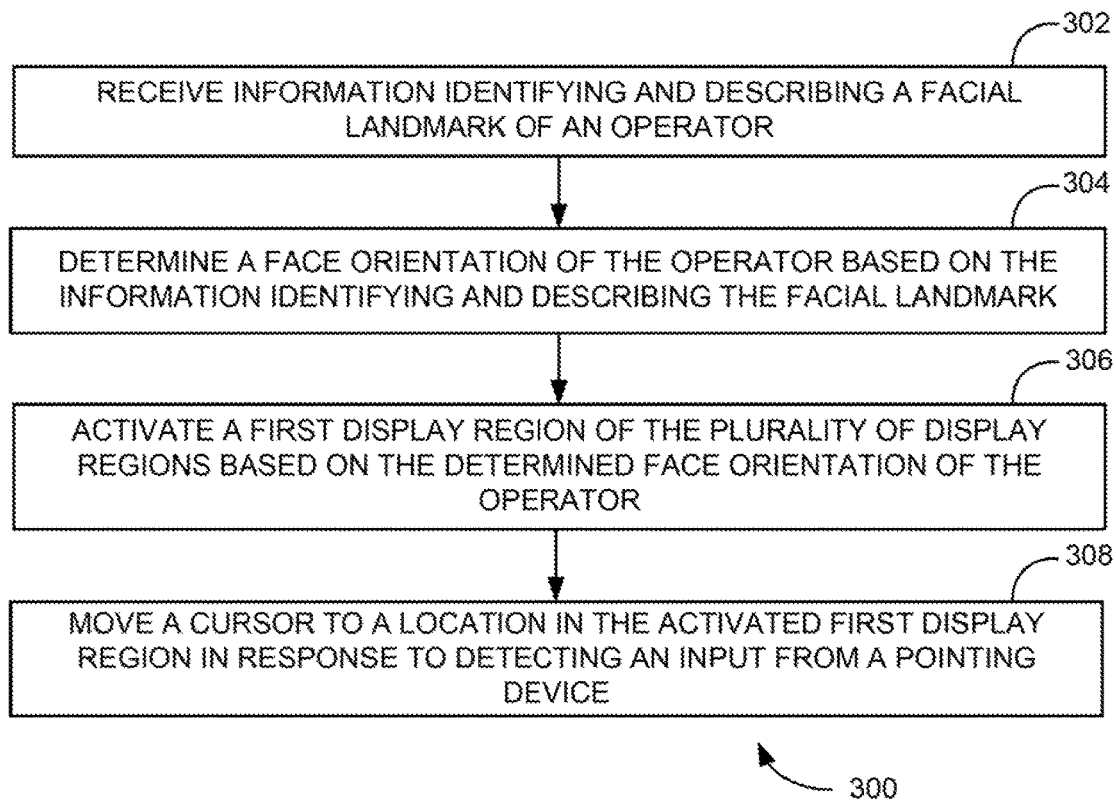
FIG. 3 illustrates an example flowchart for moving a cursor to a first display region in response to detecting an input from a pointing device.

FIG. 3 illustrates an example flowchart 300 for moving a cursor to a first display region in response to detecting an input from a pointing device. It should be understood that example flowchart 300 represents generalized illustrations, and that other processes may be added, or existing processes may be removed, modified, or rearranged without departing from the scope and spirit of the present application. Further, example flowchart 300 may not intended to limit the implementation of the present application, but rather example flowchart 300 illustrates functional information to design/fabricate circuits, generate machine-readable instructions, or use a combination of hardware and machine-readable instructions to perform the illustrated processes.

At 302, information identifying and describing a facial landmark of an operator may be received via an electronic device of the operator. In one example, the electronic device may include a display screen divided into a plurality of display regions. Example information identifying and describing the facial landmark may include information identifying and describing hair, eyebrows, eyes, glasses, ears, a forehead, a nose, a mouth, or any combination thereof.

At 304, a face orientation of the operator may be determined based on the information identifying and describing the facial landmark. In one example, the face orientation of the operator may be determined by comparing the facial landmark of the operator with stored facial landmarks and determining the face orientation of the operator based on the comparison.

At 306, a first display region of the plurality of display regions may be activated based on the determined face orientation of the operator. In one example, the first display region may be activated by identifying a predetermined face orientation by comparing the face orientation of the operator with a plurality of predetermined face orientations. Further, the first display region that may be mapped to the predetermined face orientation may be identified. In one example, each of the plurality of display regions may be mapped to one of the predetermined face orientations. In some examples, mapping information between the predetermined face orientations and the display regions may be stored in memory of the electronic device. Then, the identified first display region may be activated.

At 308, the cursor may be moved to a location in the activated first display region in response to detecting the input from the pointing device. For example, when the operator touches a touchpad or move a mouse (i.e., the pointing device), the cursor may move to a center of the activated first display region.

Figure 4A:
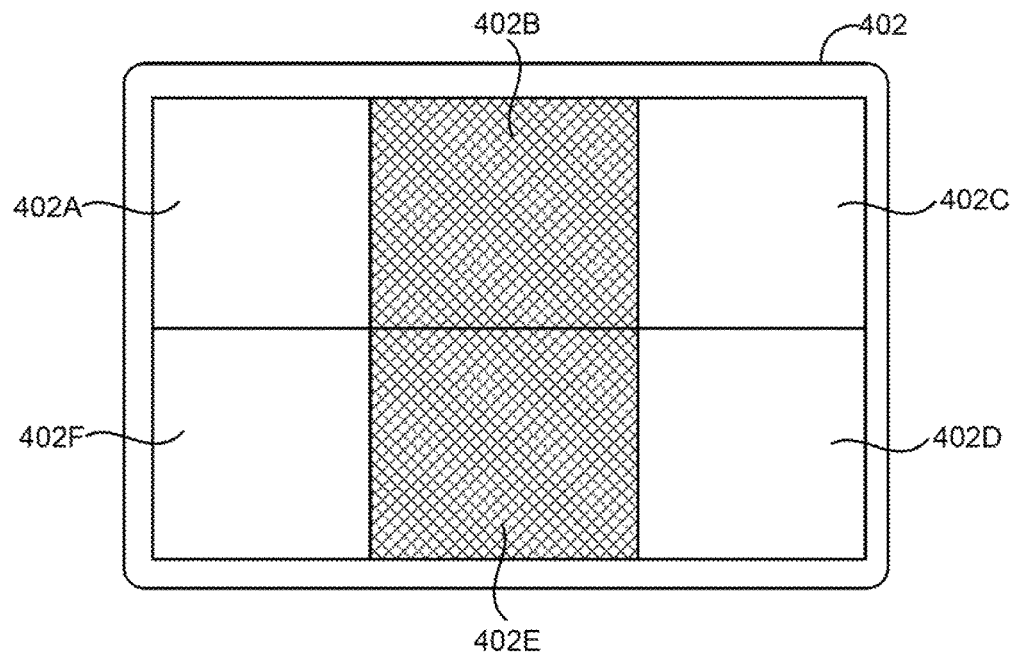
FIG. 4A illustrates a schematic diagram of an example display screen, depicting a plurality of display regions.

FIG. 4A illustrates a schematic diagram of an example display screen 402, depicting a plurality of display regions (e.g., 402A-402F). In one example, display screen 402 may be divided into multiple display regions 402A-402F. For example, a number of non-overlapping display regions (e.g., 402A-402F) may be defined based on a size of display screen 402. In one example, display regions 402A-402F may include one or more tolerance display regions 402B and 402E (e.g., at a center of display screen 402 in a horizontal direction). For example, tolerance display region 402B may be between display regions 402A and 402C. Further, tolerance display region 402E may be between display regions 402D and 402F.

Figure 4B:
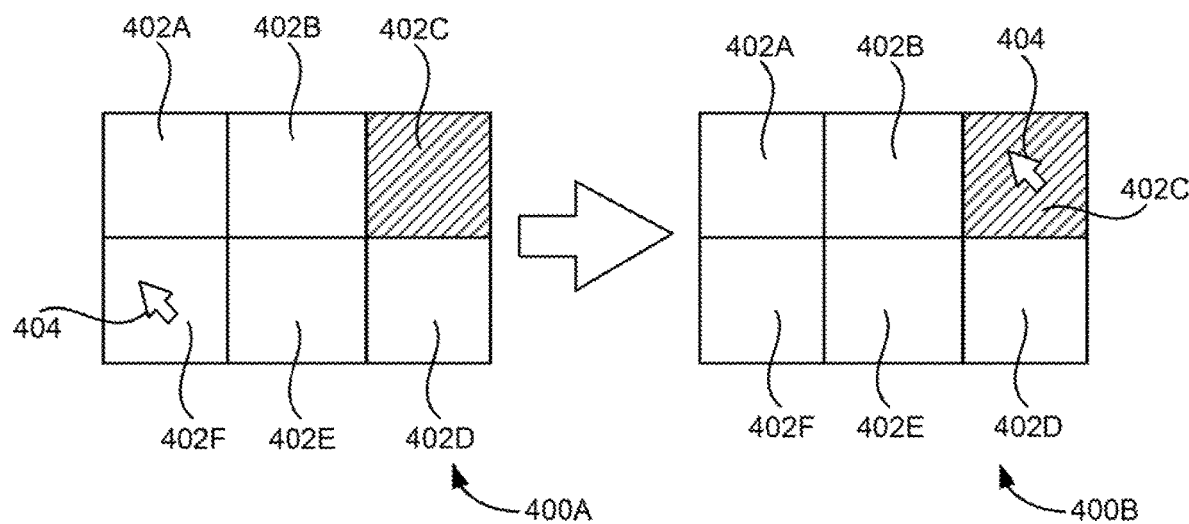
FIG. 4B illustrates a schematic diagram of the example display screen of FIG. 4A, depicting moving a cursor from a first display region to a location in a second display region based on a face orientation of an operator.

FIG. 4B illustrates a schematic diagram of example display screen 402 of FIG. 4A, depicting moving a cursor 404 from a first display region 402F to a location in a second display region 402C based on a face orientation of an operator. Similarly named elements of FIG. 4B may be similar in function and/or structure to elements described in FIG. 4A. Consider that cursor 404 may be in first display region 402F. In one example, the face orientation of the operator may be received. For example, a camera may capture the operator's face and determine the operator's face orientation based on the captured information.

Further, second display region 402C may be activated based on the face orientation. For example, when the operator is looking towards top-right, then display region 402C may be activated as shown in 400A. In this example, a determination may be made that the operator may have an intention to move cursor 404 to display region 402C. In one example, activating display region 402C may include activating a cursor positioning function on display region 402C and inactivating the cursor positioning function on remaining display regions (e.g., 402A, 402B, 402D, 402E, and 402F) based on the determined face orientation of the operator.

Furthermore, cursor 404 may be moved to the location in activated display region 402C in response to detecting the input from the pointing device as shown in 400B. For example, when the operator touches a touchpad or move a mouse, cursor 404 may fly to a center of activated display region 402C. Thus, even though the camera may continuously sense operator's face orientation, the controller may move cursor 404 when the input from the pointing device is received. Hence, cursor 404 may not be moved when the operator is just browsing through display screen 402 without having an intention to move cursor 404. In another example, cursor 404 may not move when cursor 404 is already in activated display region 402C. In yet another example, cursor 404 may not move when the operator is looking at a tolerance display region 402B or 402E.

Figure 5:
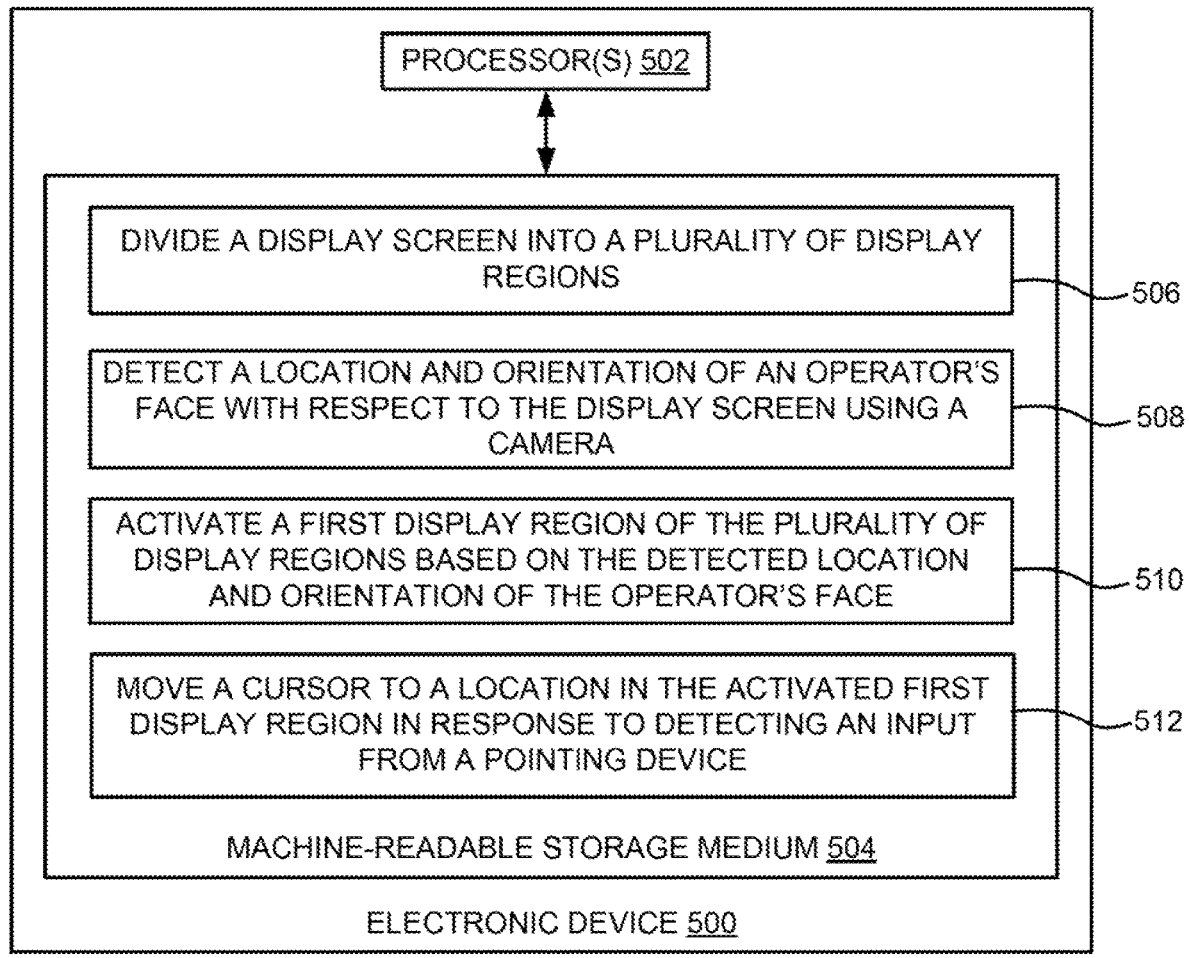
FIG. 5 is a block diagram of an example electronic device including a non-transitory machine-readable storage medium, storing instructions to move a cursor to an activated first display region in response to detecting an input from a pointing device.

FIG. 5 is a block diagram of an example electronic device 500 including a non-transitory machine-readable storage medium 504, storing instructions (e.g., 506 to 512) to move a cursor to an activated first display region in response to detecting an input from a pointing device. Electronic device 500 may include a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to electronic device 500.

As shown in FIG. 5, machine-readable storage medium 504 may store instructions 506-512. In an example, instructions 506-512 may be executed by processor 502 to move the cursor to a location in the activated first display region in response to detecting the input from the pointing device. Instructions 506 may be executed by processor 502 to divide a display screen into a plurality of display regions.

Instructions 508 may be executed by processor 502 to detect a location and orientation of an operator's face with respect to the display screen using a camera. In one example, instructions to detect the location of the operator's face may include locating the operator's face relative to the display screen. Further, instructions to detect the orientation of the operator's face may include determining information identifying and describing selected facial landmarks.

In one example, the instructions to detect the location and orientation of the operator's face may include instructions to receive an image of the operator captured using the camera of the electronic device and determine the relative location and orientation of the operator's face with respect to the display screen based on analyzing the received image. In another example, the instructions to detect the location and orientation of the operator's face may include instructions to receive information identifying and describing a facial landmark from the camera and detect the location and orientation of the operator's face with respect to the display screen based on the information identifying and describing the facial landmark.

Instructions 510 may be executed by processor 502 to activate a first display region of the plurality of display regions based on the detected location and orientation of the operator's face. Example instructions to activate the first display region may include instructions to activate the first display region upon determining that the location and orientation of the operator's face match with a first face location and orientation of a plurality of stored face locations and orientations. In one example, each of the plurality of display regions may be mapped to at least one of the stored face locations and orientations. For example, the first display region may be mapped to the first face location and orientation.

Instructions 512 may be executed by processor 502 to move the cursor to the location in the activated first display region in response to detecting the input from the pointing device. In one example, the instructions to move the cursor to the location in the activated first display region may include instructions to fly the cursor to a center of the activated first display region in response to detecting the input from the pointing device when the cursor is outside the activated first display region.

The above-described examples of the present solution are for the purpose of illustration. Although the solution has been described in conjunction with an example implementation thereof, numerous modifications may be possible without materially departing from the teachings and advantages of the subject matter described herein. Other substitutions, modifications, and changes may be made without departing from the spirit of the present solution. Also, the features disclosed in this specification (including any accompanying claims, abstract, and drawings), and/or the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An electronic device comprising:
   a display screen defining a plurality of display regions;
   a camera to capture an image of an operator of the electronic device; and
   a controller operatively coupled to the camera and display screen, wherein the controller is to:
   detect an orientation of the operator's face with respect to the display screen using the captured image;
   determine a first display region of the plurality of display regions corresponding to the detected orientation of the operator's face, wherein each of the plurality of display regions is mapped to a respective one of a plurality of face orientations; and
   activate the first display region to position a cursor of a pointing device within the first display region in response to detecting a manual input from the operator on a pointing device,
   wherein the positioning of the cursor in response to detecting the input from the pointing device is based on the detected orientation of the operator's face.

2. The electronic device of claim 1, wherein the controller is to:
   retrieve information identifying and describing a facial landmark of the operator from the captured image; and
   determine the orientation of the operator's face based on the information identifying and describing the facial landmark.

3. The electronic device of claim 2, wherein the information identifying and describing the facial landmark comprises information identifying and describing hair, eyebrows, eyes, glasses, ears, a forehead, a nose, a mouth, or any combination thereof.

4. The electronic device of claim 2, wherein the controller is to determine the orientation of the operator's face based on at least one of shape and position information included in the information identifying and describing the facial landmark.

5. A method comprising:
   receiving, via an electronic device of an operator, information identifying and describing a facial landmark of the operator, the electronic device having a display screen divided into a plurality of display regions;
   determining a face orientation of the operator based on the information identifying and describing the facial landmark;
   activating a first display region of the plurality of display regions based on the determined face orientation of the operator, wherein activating the first display region comprises:
   identifying a predetermined face orientation by comparing the face orientation of the operator with a plurality of predetermined face orientations,
   identifying the first display region that is mapped to the predetermined face orientation, wherein each of the plurality of display regions is mapped to one of the plurality of predetermined face orientations, and
   activating the identified first display region; and
   moving a cursor to a location in the activated first display region in response to detecting a manual input from the operator on a pointing device,
   wherein the movement of the cursor is based on the detected orientation of the operator's face.

6. The method of claim 5, wherein determining the face orientation of the operator comprises:
   comparing the facial landmark of the operator with stored facial landmarks; and
   determining the face orientation of the operator based on the comparison.

7. The method of claim 5, wherein activating the first display region comprises:
   activating a cursor positioning function on the first display region and inactivating the cursor positioning function on remaining display regions of the plurality of display regions based on the determined face orientation of the operator.

8. The method of claim 5, wherein the information identifying and describing the facial landmark comprises information identifying and describing hair, eyebrows, eyes, glasses, ears, a forehead, a nose, a mouth, or any combination thereof.

9. A non-transitory machine-readable storage medium encoded with instructions that, when executed by a processor of an electronic device, cause the processor to:
   divide a display screen into a plurality of display regions;
   detect a location and orientation of an operator's face with respect to the display screen using a camera;
   activate a first display region of the plurality of display regions based on the detected location and orientation of the operator's face; and
   move a cursor to a location in the activated first display region, in response to activating the first display region, upon detecting a manual input from the operator on a pointing device,
   wherein the movement of the cursor is based on the detected location and orientation of the operator's face.

10. The non-transitory machine-readable storage medium of claim 9, wherein instructions to detect the location and orientation of the operator's face comprise instructions to:
    receive an image of the operator captured using the camera of the electronic device; and
    determine the location and orientation of the operators face with respect to the display screen based on analyzing the received image.

11. The non-transitory machine-readable storage medium of claim 9, wherein instructions to detect the location and orientation of the operator's face comprise instructions to:

receive information identifying and describing a facial landmark from the camera; and detect the location and orientation of the operator's face with respect to the display screen based on the information identifying and describing the facial landmark.

12. The non-transitory machine-readable storage medium of claim 11, wherein instructions to activate the first display region comprise instructions to:

activate the first display region upon determining that the location and orientation of the operators face match with a first face location and orientation of a plurality of stored face locations and orientations, wherein each of the plurality of display regions is mapped to at least one of the plurality of stored face locations and orientations, and wherein the first display region is mapped to the first face location and orientation.

13. The non-transitory machine-readable storage medium of claim 9, wherein instructions to move the cursor to the location in the activated first display region comprises instructions to:

fly the cursor to a center of the activated first display region in response to detecting the input from the pointing device when the cursor is outside the activated first display region.

14. The non-transitory machine-readable storage medium of claim 9, wherein the plurality of display regions are non-overlapping.

15. The electronic device of claim 1, wherein the cursor already located in the first display region is not moved based on the detected orientation of the operator's face.

16. The electronic device of claim 1, wherein the cursor located in a second display region adjacent the first display region is not moved based on the detected orientation of the operator's face.

17. The electronic device of claim 1 wherein the camera captures a second image of the operator of the electronic device, wherein controller is further to:

detect a second orientation of the operator's face with respect to the display screen using the second captured image;

determine a second display region of the plurality of display regions corresponding to the second detected orientation of the operator's face; and activate the second display region to position the cursor of the pointing device within the second display region in response to detecting a second input from the pointing device, wherein the positioning of the cursor in response to detecting the second input from the pointing device is based on the second detected orientation of the operator's face.

* * * * *